United States Patent
Nardi et al.

(10) Patent No.: US 7,908,112 B2
(45) Date of Patent: Mar. 15, 2011

(54) DYNAMIC OBSERVER FOR THE ESTIMATION OF VEHICLE LATERAL VELOCITY

(75) Inventors: Flavio Nardi, Farmington Hills, MI (US); Jihan Ryu, Rochester Hills, MI (US); Nikolai K. Moshchuk, Grosse Pointe, MI (US); Kevin A. O'Dea, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 140 days.

(21) Appl. No.: 12/276,965

(22) Filed: Nov. 24, 2008

(65) Prior Publication Data

US 2010/0131229 A1    May 27, 2010

(51) Int. Cl.
G01P 3/00 (2006.01)
(52) U.S. Cl. ...................................... 702/142
(58) Field of Classification Search ............... 702/96, 702/142
See application file for complete search history.

(56) References Cited

U.S. PATENT DOCUMENTS

| | | | |
|---|---|---|---|
| 5,742,919 A * | 4/1998 | Ashrafi et al. | 701/70 |
| 6,122,584 A * | 9/2000 | Lin et al. | 701/70 |
| 6,816,804 B1 * | 11/2004 | Lee | 702/148 |
| 2004/0074693 A1 * | 4/2004 | Mattson et al. | 180/446 |
| 2004/0128060 A1 * | 7/2004 | Park | 701/124 |
| 2006/0106516 A1 * | 5/2006 | Pick et al. | 701/41 |
| 2008/0059021 A1 * | 3/2008 | Lu et al. | 701/36 |
| 2008/0183419 A1 * | 7/2008 | Cong et al. | 702/155 |

* cited by examiner

*Primary Examiner* — Tung S Lau
(74) *Attorney, Agent, or Firm* — John A. Miller; Miller IP Group, PLC

(57) ABSTRACT

A system and method for estimating vehicle lateral velocity that defines a relationship between front and rear axle lateral forces and front and rear axle side-slip angles. The method includes providing measurements of vehicle yaw-rate, lateral acceleration, longitudinal speed, and steering angle. The method also includes using these measurements to provide a measurement of the front and rear axle forces. The method calculates a front axle lateral velocity and a rear axle lateral velocity, and calculates a front axle side-slip angle based on the rear axle lateral velocity and a rear axle side-slip angle based on the front axle lateral velocity. The method then estimates front and rear axle forces, and selects a virtual lateral velocity that minimizes an error between the estimated and measured lateral axle forces. The method then provides an estimated vehicle lateral velocity using the selected virtual lateral velocity.

11 Claims, 5 Drawing Sheets

DYNAMIC OBSERVER FOR THE ESTIMATION OF VEHICLE LATERAL VELOCITY

BACKGROUND OF THE INVENTION

1. Field of the Invention

This invention relates generally to a system and method for estimating vehicle lateral velocity and, more particularly, to a system and method for estimating vehicle lateral velocity that employs a dynamic observer for relating front and rear axle lateral forces to front and rear axle side-slip angles.

2. Discussion of the Related Art

Vehicle stability control systems are known in the art to enhance vehicle stability in the event that the system detects that the vehicle may not be operating as the driver intends. For example, on an icy or snowy surface, the driver may steer the vehicle in one direction, but the vehicle may actually travel in another direction. Signals from various sensors, such as yaw-rate sensors, hand-wheel angle sensors, lateral acceleration sensors, etc., can detect the vehicle instability. Calculations made by these types of vehicle stability control systems often require an estimation of the vehicle's lateral velocity and/or the surface coefficient of friction. Typically, it is necessary to know at least some assumption of the surface coefficient of friction to estimate the vehicles lateral velocity. The estimation of the surface coefficient of friction based on a lateral acceleration is typically not robust relative to a banked curve because of the gravity bias effect on the body mounted lateral accelerometer.

Estimation of a vehicle's lateral velocity, or vehicle side-slip angle, has been a research subject for many years. Known work has shown the performance of four different methods to estimate side-slip angle. These methods include the integration of a lateral acceleration signal, with and without a "wash-out" filter, a simple algebraic approach and a non-linear observer with and without measurement update, sometimes referred to as an output injection. Other work combined a model-based observer with direct integration of vehicle kinematic equations based on weights determined by the degree of a nonlinear state of the vehicle. The nonlinear state of the vehicle is established by the deviation of the yaw-rate from a predetermined reference value. The resulting observer utilizes an estimate of surface coefficient of friction and road bank angle to maintain accuracy and robustness. Other work demonstrated the performance of an extended Kalman filter based on the single track bicycle model. The estimation of surface coefficient of friction is based on a least squares regression of the difference between the actual and tire model-based lateral forces. The stability of the proposed observer on banked roads and in the presence of sensor bias was not addressed. Other work proposed two nonlinear observers based on a two track vehicle model. The proposed observers use the estimation of cornering stiffness from a nonlinear least squares technique.

Current production yaw stability control systems do not rely directly on feedback control of lateral velocity or side-slip angle estimates because a production level robust and accurate estimate of lateral velocity has not been fully developed. However, production yaw stability control systems do utilize an estimate of a vehicle's lateral velocity to influence or modify the yaw-rate error used for feedback control. The lateral velocity estimate can influence the yaw control strategy, but typically only when a non-zero yaw-rate error is calculated. In general, there are dynamic conditions in which the vehicle develops a side-slip angle that the yaw stability controller will not detect and stabilize. When the vehicle develops large side-slip angles, it becomes less responsive to steering input and more difficult for the driver to control. This can happen, for example, during open loop steering maneuvers on low coefficient of friction surfaces. During an open loop steering maneuver, the driver inputs a ramp steer up to 90° and holds the steering wheel angle. While such maneuvers might seem unreasonable because they require the driver not to correct a possible vehicle over-steer behavior, it cannot be assumed that all drivers would know when and how to counter-steer the vehicle out of the unstable condition. Any instance in which the vehicle's side-slip angle increases to a relatively large level for a given surface the driver may have trouble controlling the vehicle. Standard stability control systems allow the estimation of lateral velocity to rely only on the use of yaw-rate, lateral acceleration, steering wheel angle, and wheel speed sensor measurements. The estimation of lateral velocity also requires an estimate of the lateral surface coefficient of friction.

SUMMARY OF THE INVENTION

In accordance with the teachings of the present invention, a system and method are disclosed for estimating vehicle lateral velocity that defines a relationship between front and rear axle lateral forces and front and rear axle side-slip angles. The method includes providing measurements of vehicle yaw-rate, longitudinal speed, lateral acceleration and steering angle. The method also includes using these measurements to provide a measurement of the front and rear axle forces. The method calculates a front axle lateral velocity and a rear axle lateral velocity, and calculates a front axle side-slip angle based on the rear axle lateral velocity and a rear axle side-slip angle based on the front axle lateral velocity. The method then estimates front and rear axle forces, and selects a virtual lateral velocity that minimizes an error between the estimated and measured lateral axle forces. The method then provides an estimated vehicle lateral velocity using the selected virtual lateral velocity.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for estimating surface coefficient of friction is merely exemplary in nature, and is in no way intended to limit the invention or its applications or uses. For example, the discussion below concerns estimating surface coefficient of friction for a vehicle system. However, as will be appreciated by those skilled in the art, the coefficient of friction estimation system may have other applications.

Figure 1:
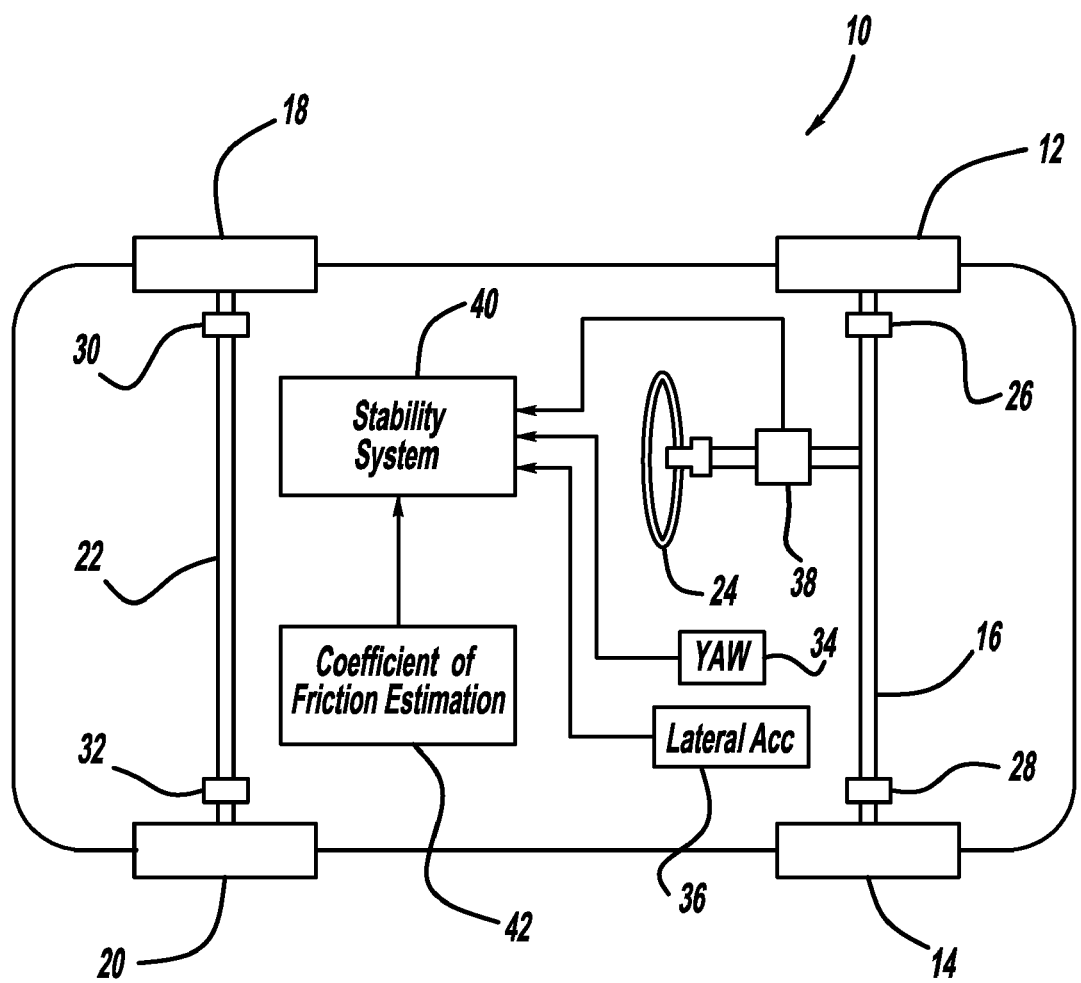
FIG. 1 is a schematic plan view of a vehicle including a vehicle stability control system and a processor for estimating surface coefficient of friction.

FIG. 1 is a plan view of a vehicle 10 including front wheels 12 and 14 connected by a front axle 16 and rear wheels 18 and 20 connected by a rear axle 22. A steering wheel 24 steers the front wheels 12 and 14. A wheel speed sensor 26 measures the speed of the front wheel 12, a wheel speed sensor 28 measures the speed of the front wheel 14, a wheel speed sensor 30 measures the speed of the rear wheel 18 and a wheel speed sensor 32 measures the speed of the rear wheel 20. A yaw-rate sensor 34 measures the yaw-rate of the vehicle 10, a lateral acceleration sensor 36 measures the lateral acceleration of the vehicle 10 and a hand-wheel angle sensor 38 measures the turning angle of the steering wheel 24. A controller 40 provides vehicle control, such as vehicle stability control, and is intended to represent any suitable vehicle controller that makes use of vehicle lateral velocity $v_y$ and/or surface coefficient of friction $\mu$. A coefficient of friction processor 42 estimates the coefficient of friction $\mu$ of the surface that the vehicle 10 is traveling on, as will be discussed in detail below.

The present invention proposes an algorithm for estimating vehicle lateral velocity, or side-slip angle, that requires measurement inputs from a standard vehicle stability enhancement system's (VSES) sensor set, such as, steering wheel angle, yaw-rate, lateral acceleration and wheel speeds. The proposed algorithm employs a vehicle-dependent nonlinear lateral force model, a kinematic observer and a surface coefficient of friction estimator. The nonlinear force model is obtained by performing a set of nonlinear handling maneuvers on at least three different surfaces, such as high, medium and low coefficient of friction surfaces, while measuring longitudinal and lateral vehicle speed with an optical sensor, in addition to the standard VSES measurements. This lateral force model is then used to estimate the vehicle lateral forces. The model provides an estimate of the vehicle lateral velocity until the tire's lateral forces saturate the surface adhesion capability. The model is also robust to bank angle. However, the model cannot provide robust lateral velocity estimates when the tires saturate the surface lateral capability and becomes nonlinear. In addition, the model cannot provide robust estimates when tire characteristics change due to tire change, wear, aging, etc. To estimate the lateral velocity correctly in both linear and nonlinear regions, and to compensate for tire characteristic changes, a kinematic observer is integrated with the lateral force model. The estimation of the surface coefficient of friction $\mu$ is a critical part of assessing the transition from linear to nonlinear tire behavior. The proposed surface coefficient of friction estimation is also insensitive to bank angle.

First, a fitted model of the lateral axle force relationship to side-slip angle is obtained. An important part of the observer used to estimate lateral velocity $v_y$ is determining the relationship between the axle side-slip angles $\alpha_F$, $\alpha_F$ and the lateral forces at each axle $F_{yF}$, $F_{yR}$. Often, the relationship between the axle side-slip angles and the lateral axle forces is modeled using a simple linear tire model by $F_{yF}=C_F\alpha_F$ and $F_{yR}=C_R\alpha_R$, where $C_F$ and $C_R$ are the front and rear cornering stiffness, respectively. This model breaks down when the lateral force saturates, which is often accounted for by a second cornering stiffness at some axle side-slip angle value or by using a non-linear tire model that mimics the lateral force saturation as the side-slip angle increases.

The model employed in the observer uses neither of those approaches, but instead uses front and rear axle lateral forces versus side-slip angle relation including suspension compliance. The lateral force versus side-slip angle tables are empirically obtained by performing nonlinear handling maneuvers while measuring lateral acceleration, yaw-rate, steering wheel angle, longitudinal velocity and lateral velocity. One advantage of this model over other methods is that it uses the measured vehicle data directly. Since the data is collected on the vehicle, the tire non-linearity, suspension effects, etc. are included in the values that go into the table. The resulting model is a lumped parameter relation that encompasses all compliance elements that affect the lateral forces. Such a model is in general more accurate for vehicle dynamics use than other models typically used, such as derived from tire machine experimental measurements.

Figure 2:
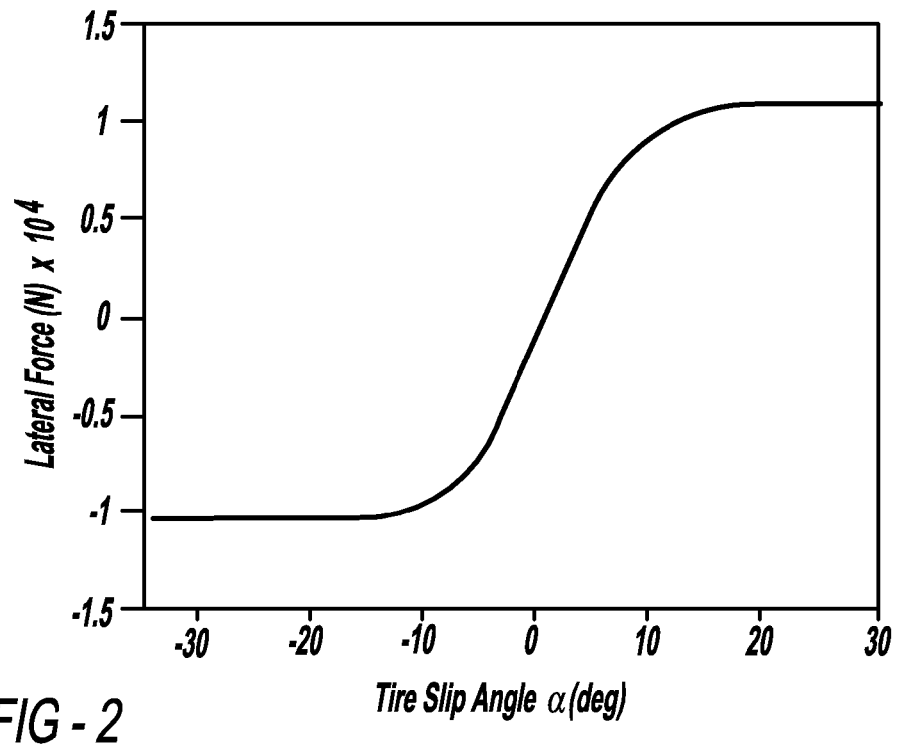
FIG. 2 is a graph with tire side-slip angle on the horizontal axis and lateral force on the vertical axis showing the lateral force versus tire side-slip angle relationship for a high coefficient of friction surface.
Figure 3:
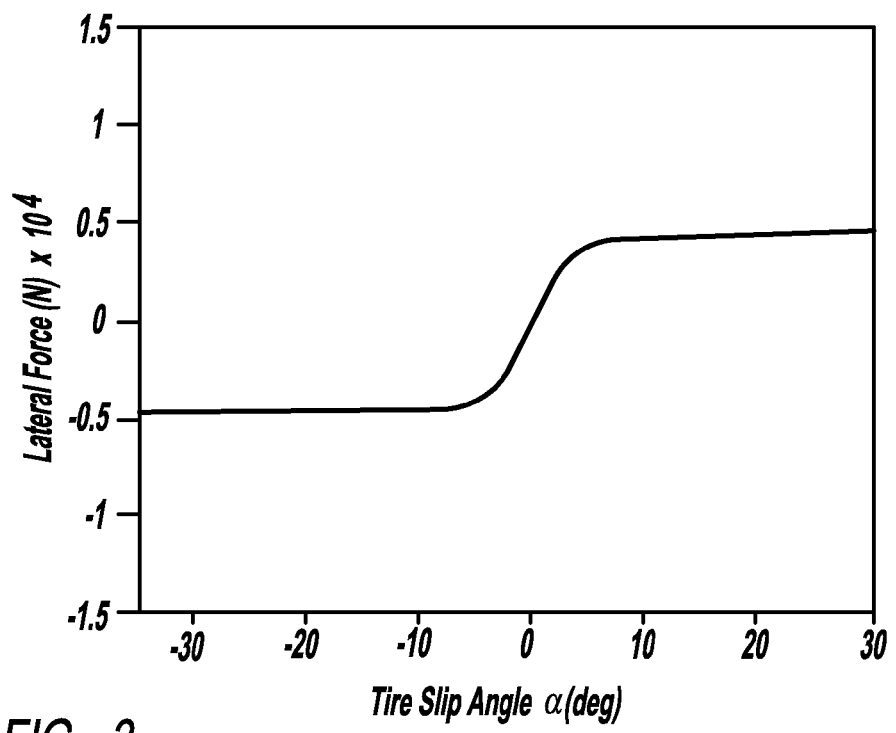
FIG. 3 is a graph with tire side-slip angle on the horizontal axis and lateral force on the vertical axis showing the lateral force versus tire side-slip angle relationship for a low coefficient of friction surface.

FIG. 2 is a graph with tire side-slip angle on the horizontal axis and lateral force on the vertical axis showing a lateral force versus tire side-slip angle table for a high coefficient of friction surface, such as dry asphalt, and FIG. 3 is a graph with tire side-slip angle on the horizontal axis and lateral force on the vertical axis showing a lateral force versus tire side-slip angle table for a low coefficient surface, such as snow.

One method for collecting the data is to instrument a vehicle and take measurements on various surfaces while allowing the vehicle to achieve large side-slip angle values. This is best achieved by slalom and step steering to the steering wheel angle corresponding to the maximum lateral capability of the vehicle 10 and then holding the input. As the steering wheel 24 is held, the vehicle 10 should slowly develop the desired level of side-slip angle for this test. The driver can then steer out of the skid. This procedure may need to be adjusted based on the vehicle 10.

Once the vehicle data is collected, the lateral force versus side-slip angle tables can be generated by calculating lateral forces and side-slip angles at the front and rear axles 16 and 22 from the measurements. The axle forces are calculated from lateral acceleration and yaw rate measurements.

Lateral acceleration measurements should be compensated for vehicle roll because lateral acceleration measurements are affected by gravity due to vehicle roll. Vehicle roll angle can be estimated using a 1-DOF (degree-of-freedom) vehicle roll dynamics model with lateral acceleration input. Previous research has shown that roll angle and roll rate estimation based on a 1-DOF model provides accurate and robust estimation results in both linear and non-linear ranges. The inertial force $M_s a_y$ due to lateral acceleration produces the roll moment $M_s a_y h_s$ on the vehicle sprung mass, where $M_s$ is the sprung mass, $a_y$ is the lateral acceleration and $h_s$ is the sprung mass center of gravity height above the roll axis. The roll moment then generates the vehicle roll angle $\phi$. Taking into account the effect of gravity, the equation of vehicle roll motion is given by:

$$(I_x+M_s h_s^2)\ddot{\phi}+c_\phi\dot{\phi}+k_\phi\phi=M_s a_{y,m} h_s \tag{1}$$

Where, $I_x$ is the moment of inertia about its roll axis, $k_\phi$ is the roll stiffness and $c_\phi$ is the roll damping coefficient. The value $a_{y,m}$ represents the measured lateral acceleration, which includes gravity due to vehicle roll ($a_{y,m}=a_y+g\sin\phi$).

The lateral acceleration measurement is then compensated for gravity due to vehicle roll based on equation (1) as:

$$a_{y,m}=a_y+g\sin\phi \tag{2}$$

Where,

-continued $$\phi = f_{roll}(a_{y,m}) \quad (3)$$

$$\therefore \mathcal{L}\left\{\frac{f_{roll}}{a_{y,m}}\right\} = \frac{M_s h_s / I_x + M_s h_s^2}{s^2 + {}^{c_\phi}/I_x + M_s h_s^{2s} + k_\phi / I_x + M_s h_s^2} \quad (4)$$

Front and rear axle forces are then calculated from compensated lateral acceleration and yaw-rate measurements based on the force and moment balance as:

$$\begin{bmatrix} F_{yF} \\ F_{yR} \end{bmatrix} = \begin{bmatrix} \frac{1}{m}\cos\delta & \frac{1}{m} \\ \frac{a}{I_z}\cos\delta & -\frac{b}{I_z} \end{bmatrix}^{-1} \begin{bmatrix} a_{y,compensated} \\ \dot{r} \end{bmatrix} \quad (5)$$

Where, $F_{yF}$ and $F_{yR}$ are front and rear lateral forces, respectively, $\delta$ is the steering angle at the front axle 16, a and b are longitudinal distances of the front and rear axles 16 and 22 from the center of gravity (CG), $I_z$ is the moment of inertia about its yaw axis and r is the vehicle yaw-rate. Equation (5) is based on a single track bicycle model.

The front and rear axle side-slip angles are calculated from measured lateral velocity, yaw-rate and longitudinal velocity. Because vehicle roll motion adds an extra component to the lateral velocity measurement, measured lateral velocity is compensated for roll motion using roll rate information. Similarly to the lateral acceleration case, vehicle roll rate is estimated using the 1-DOF model described in equation (1) as:

$$v_{y,compensated} = v_{y,m} + c_{vy,rr}p. \quad (6)$$

Where, $$p = f_{rollrate}(a_{y,m}) \quad (7)$$

$$\therefore \mathcal{L}\left\{\frac{f_{rollrate}}{a_{y,m}}\right\} = \frac{M_s h_s / I_x + M_s h_s^2 s}{s^2 + {}^{c_\phi}/I_x + M_s h_s^{2s} + k_\phi / I_x + M_s h_s^2} \quad (8)$$

The value $v_{y,m}$ is the measured lateral velocity and p is the vehicle roll rate. The value $c_{vy,rr}$ is a coefficient for translating roll rate to an additional lateral velocity component, and can be empirically determined based on static vehicle roll center height. Front and rear axle side-slip angles are then computed based on kinematic relationship between the lateral velocity $v_y$ and the axle side-slip angles $\alpha_F$, $\alpha_R$ as:

$$\alpha_F = \tan^{-1}\left(\frac{v_{y,compensated} + ar}{v_x}\right) - \delta \quad (9)$$

$$\alpha_R = \tan^{-1}\left(\frac{v_{y,compensated} - br}{v_x}\right) \quad (10)$$

Where, $v_x$ is the vehicle longitudinal velocity and $\delta$ is the steering angle. Front and rear axle lateral force versus side-slip angle tables are generated using calculated forces and side-slip angles as described in equations (8) and (10).

The lateral force side-slip angle tables can be generated by calculating lateral forces and side-slip angles at the front and rear axles 16 and 22. Axle forces are calculated from lateral acceleration and yaw-rate measurements. In addition, front and rear axle side-slip angles are calculated from measured lateral velocity, yaw-rate and longitudinal velocity. Lateral acceleration and lateral velocity measurements should be compensated for vehicle roll motion because lateral acceleration measurement is affected by gravity due to vehicle roll, and vehicle roll motion adds an extra component in lateral velocity measurements.

Axle lateral force versus side-slip angle tables can be provided from experimental data on dry asphalt (high μ) and snow field (low μ). The actual table data can be fit with any non-linear function. For example, the table data can be fit using a hyperbolic tangent function with the following form.

$$F_{yF} = f_{tableF}(\alpha_F, \mu) = c_{tableF}\mu\tanh\left(\frac{d_{tableF}}{\mu}\alpha_F\right) \quad (11)$$

$$F_{yF} = f_{tableR}(\alpha_F, \mu) = c_{tableR}\mu\tanh\left(\frac{d_{tableR}}{\mu}\alpha_R\right) \quad (12)$$

Where, $F_{yF}$ and $F_{yR}$ are front and rear lateral forces, $\alpha_F$ and $\alpha_R$ are front and rear axle side-slip angles and μ represents surface coefficient of friction. The values $c_{tableF}$, $d_{tableF}$, $c_{tableR}$ and $d_{tableR}$ are function parameters.

Note that the slope of each curve in the linear range is almost the same, which implies that surface determination is not easily achieved in the linear range. It is assumed that there is no significant lag between the lateral tire side-slip angle and the lateral tire force.

The estimation of surface coefficient of friction μ is required to determine an accurate and robust estimation of vehicle lateral velocity. One proposed estimation method assumes the use of a standard VSES sensor set including a yaw-rate sensor, a lateral acceleration sensor, a steering wheel angle sensor and wheel speeds sensors. Common coefficient of friction μ estimation methods are typically based on the measurement of lateral acceleration and/or its error with respect to a tire model based estimate.

One relevant issue when relying on the measured lateral acceleration signal is its sensitivity to road bank angle. When a vehicle is driven on a banked road, or an on-camber curve, the lateral acceleration signal outputs a lower acceleration due to the gravity bias. Thus, in general, if the lateral acceleration signal is used to determine the surface coefficient of friction μ on banked roads, the accelerometer would suggest that the surface coefficient of friction μ is equivalent to a low value of the coefficient of friction μ. Such wrong interpretation of the surface coefficient of friction would cause the estimate of lateral velocity to diverge.

In equations (11) and (12), a tire mathematical model was presented that fits the experimental measurements quite accurately. The proposed model demonstrates that the axles' lateral forces are a function of the surface coefficient of friction and the vehicle's lateral velocity. Furthermore, it is clear that the slope of the lateral tire force with respect to the axle's side-slip angle is practically the same for all surface coefficients of friction. This is because it is very difficult to fit different lines through the linear data spread acquired experimentally. Based on this statement, it is concluded that the estimation of the surface coefficient of friction μ can only be accurately performed when the tire forces saturate, or almost saturate, and the vehicle's dynamic state is nonlinear. In order to establish when the vehicle dynamic state is linear or non-linear, kinematic relations need to be introduced.

Figure 4:
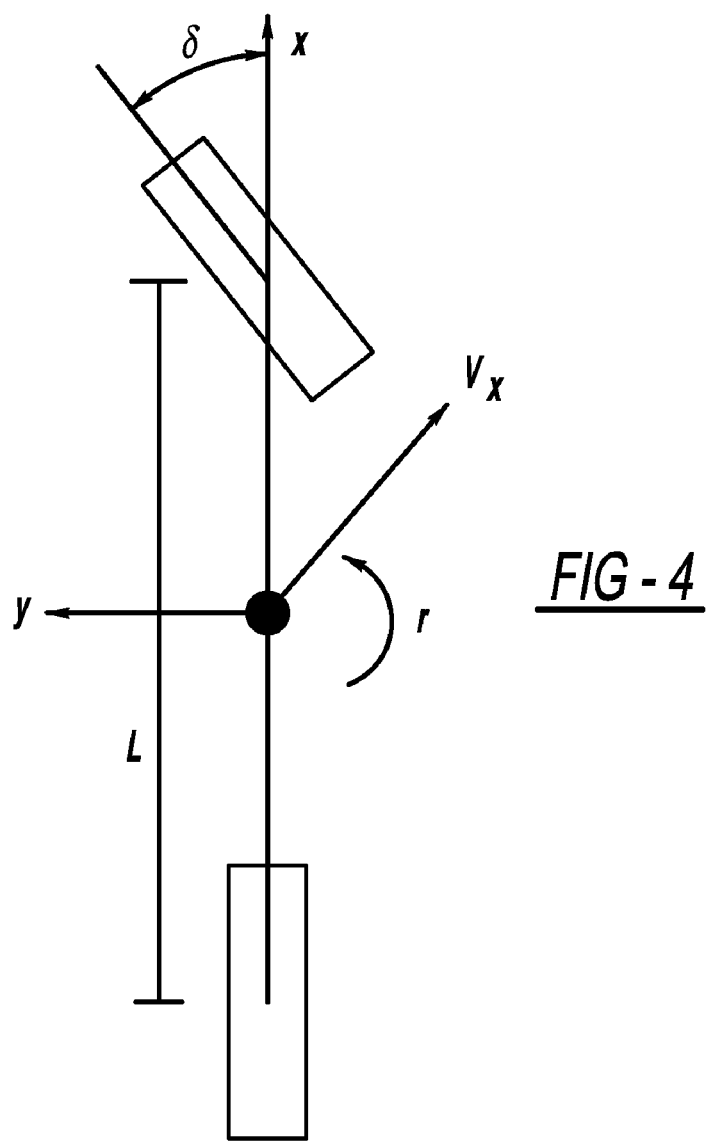
FIG. 4 is a dynamics relationship diagram showing bicycle kinematics between front and rear side-slip angles.

FIG. 4 is a dynamics diagram showing variables for a bicycle kinematics relationship between front and rear side-slip angles to vehicle yaw-rate, longitudinal velocity and steering wheel angle. The single track bicycle kinematic equation that relates the front and rear axle side-slip angles to the vehicle's yaw-rate, longitudinal velocity and steering angle is as follows.

$$L\frac{r}{v_x} = \tan(\delta + \alpha_F) - \tan\alpha_R \quad (13)$$

Where, L is the vehicle wheel base, $v_x$ is the vehicle speed and r is the vehicle yaw-rate.

This simple relationship reflects the kinematics of a general plane motion of a rigid body. It states that the difference between the lateral velocity at the front and the rear axles 16 and 22 is equal to the product of the angular velocity and the wheelbase. Equation (13) holds for any surface coefficient of friction and is independent of tire dynamics and a vehicle's inertial parameters. The front and rear axle side-slip angles can be related to the lateral force and lateral coefficient of friction µ through the following generic nonlinear function.

$$\alpha_F = f_{tableF}(F_{yF}, \mu) \quad (14)$$

$$\alpha_R = f_{tableR}(F_{yR}, \mu) \quad (15)$$

By introducing the nonlinear equations (14) and (15) into equation (13), the following equation (16) is obtained.

$$L\frac{r}{v_x} = \tan[\delta + f_{tableF}(F_{yF}, \mu)] - \tan[f_{tableR}(F_{yR}, \mu)] \quad (16)$$

The front and rear axle lateral forces $F_{yF}$ and $F_{yR}$ are estimated by equation (16). In an alternate embodiment, the front and rear axle lateral forces $F_{yF}$ and $F_{yR}$ are measured. All of the variables in the equation are insensitive to the road bank angle effects since all the equations are considered in the road plane. An interesting characteristic of equation (16) is that there is only one unknown, the surface coefficient of friction µ. However, solving equation (16) is non-trivial due to the lack of a unique solution. Moreover, a simple and effective method to solve equation (16) numerically is yet to be found.

Figure 5:
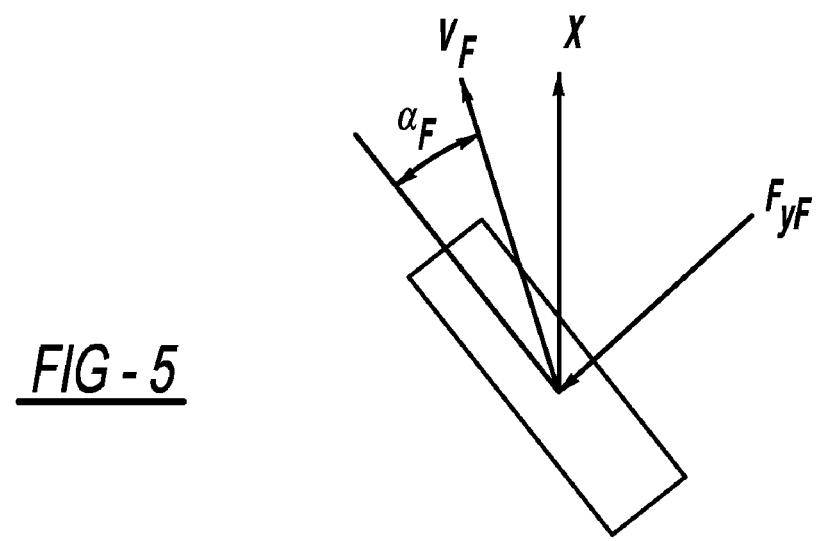
FIG. 5 is a dynamics relationship diagram showing front and rear axle side-slip angles related to lateral force and lateral coefficient of friction.

Even without a unique solution, equation (16) is very useful to determine when the vehicle dynamic state is nonlinear. FIG. 5 is a dynamics diagram showing front and rear axle side-slip angles related to the lateral force and lateral coefficient of friction p through a non-linear function. To this end, consider introducing a simple linear function of the side-slip angle and lateral force in equation (13) as:

$$L\frac{r}{v_x} \approx \tan\left(\delta + \frac{F_{yF}}{C_F}\right) - \tan\left(\frac{F_{yR}}{C_R}\right) \quad (17)$$

Equation (17) holds only when the vehicle is driven in the linear region, typically when the lateral acceleration is below 3 m/sec². When the vehicle's dynamic state is nonlinear, equation (17) becomes an inequality and the coefficient of friction µ can be estimated where the tire forces are saturated in the nonlinear region.

For all practical purposes, when the error between the two sides of equation (17) exceeds a pre-established threshold, the coefficient of friction µ is approximated by the following relation.

$$\mu_{estimate} = \frac{|F_{yF} + F_{yR}|}{F_{yF,MAX} + F_{yR,MAX}} \quad (18)$$

Where, $F_{yF,MAX}$ and $F_{yR,MAX}$ are front and rear axle maximum lateral force at µ=1, respectively.

The value $\mu_{estimate}$ is gradually returned to the default value of one when the vehicle kinematics condition is such that the difference between the left and right hand side of equation (18) is less than the threshold. The threshold is vehicle-dependent and can be determined empirically considering the noise level of the measured data. The threshold is in general a function of forward velocity and steering wheel angle.

In summary, the estimate of lateral surface coefficient of friction $\mu_{estimate}$ is given by the following two conditions.

$$\mu_{estimate} = \begin{cases} \frac{|F_{yF} + F_{yR}|}{F_{yF,MAX} + F_{yR,MAX}} & \left|\left[L\frac{r}{v_x}\right] - \left[\tan\left(\delta - \frac{F_{yF}}{C_F}\right) + \tan\left(\frac{F_{yR}}{c_R}\right)\right]\right| > \text{threshold} \\ 1 & \left|\left[L\frac{r}{v_x}\right] - \left[\tan\left(\delta - \frac{F_{yF}}{C_F}\right) + \tan\left(\frac{F_{yR}}{c_R}\right)\right]\right| \leq \text{threshold} \end{cases} \quad (19)$$

The proposed coefficient of function µ estimation is robust for banked curve and is sufficiently accurate if used to estimate the vehicle's lateral velocity.

Figure 6:
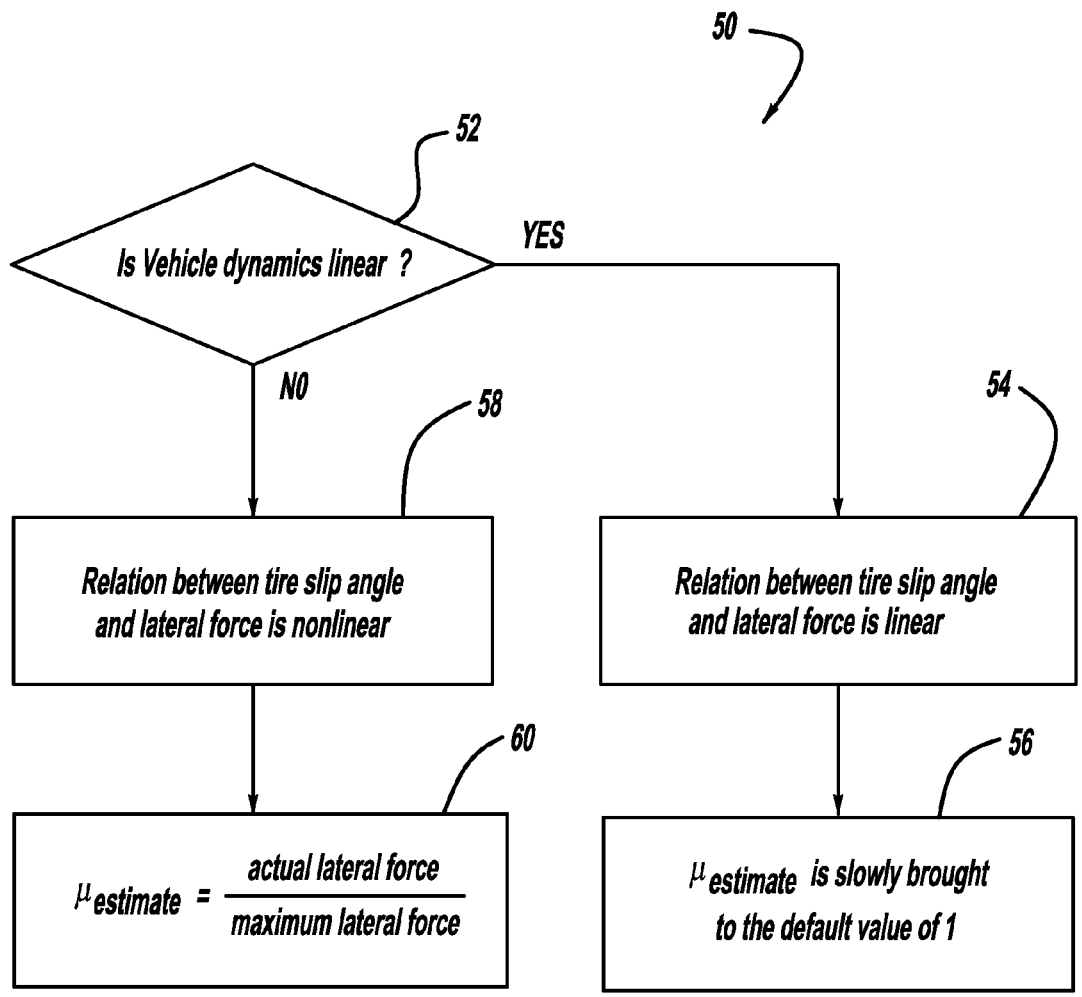
FIG. 6 is a flow chart diagram showing a process for estimating surface coefficient of friction.

FIG. 6 is a flow chart diagram 50 showing a general outline of the process described above for estimating the surface coefficient of friction µ. The algorithm first determines whether the vehicle 10 is operating in a linear region at decision diamond 52, and if so, determines that the relationship between the tire side-slip angles and lateral forces is linear at box 54. In the linear dynamics region, the estimate of the surface coefficient of friction is slowly brought to the default value of 1 at box 56. If the vehicle 10 is not operating in a linear region at decision diamond 52, then the relationship between the tire side-slip angles and lateral forces is non-linear at box 58, and the coefficient of friction µ is estimated at box 60 as discussed above.

A discussion above is given for estimating the vehicle lateral velocity $v_y$ and the surface coefficient of friction µ. According to another embodiment, the lateral velocity $v_y$ and the surface coefficient of friction µ can be estimated using an algebraic estimator that employs at least part of the discussion above, including the lateral force versus tire side-slip angle tables shown in FIGS. 2 and 3 and the representative discussion. The lateral velocity $v_y$ and the surface coefficient of friction µ can be estimated using front and rear axle lateral force versus side-slip angle tables with standard sensor measurements. The tables represent the relationship between the lateral force and side-slip angle for a combined system of tire and suspension. The lateral force versus side-slip angle tables are empirically obtained by performing nonlinear handling maneuvers while measuring lateral acceleration, yaw-rate, steering wheel angle, longitudinal velocity and lateral velocity. Because the data was collected on the vehicle, the tire non-linearity, suspension effects, etc. are included in the values that go into the table, i.e., the table represents a lumped parameter model that encompasses everything that affects the lateral forces.

The resulting estimated lateral velocity $v_y$ and surface coefficient of friction $\mu$ are robust to bank angle bias because the table model representation of the force side-slip angle relation is insensitive to bank angle effects. Furthermore, since the table look-up relation is of an algebraic nature, the resulting lateral velocity estimate does not accumulate sensor bias and/or sensitivity errors.

The lateral velocity $v_y$ and the coefficient of surface friction $\mu$ are simultaneously estimated by algebraically solving the relationship between the lateral axle force and the side-slip angle. This approach purely relies on the front and rear axle lateral forces versus side-slip angle tables and does not use any vehicle lateral dynamics model.

Front and rear axle forces are calculated from compensated lateral acceleration and yaw-rate measurements based on the force and moment balance as:

$$\begin{bmatrix} F_{yF} \\ F_{yR} \end{bmatrix} = \begin{bmatrix} \frac{1}{m}\cos\delta & \frac{1}{m} \\ \frac{a}{l_z}\cos\delta & -\frac{b}{l_z} \end{bmatrix}^{-1} \begin{bmatrix} a_{y,compensated} \\ \dot{r} \end{bmatrix} \quad (20)$$

Where, $\delta$ is the steering angle at the front axle 16, a and b are longitudinal distances of the front and rear axles 16 and 22 from the center of gravity, $I_z$ is the moment of inertia about its yaw axis and r is the vehicle yaw-rate. Equation (20) is based on a single track bicycle model.

Two equations with two unknowns are then generated from the calculated lateral forces and available measurements as follows.

$$F_{yF} = f_{tableF}(\alpha_F, \mu) = f_{tableF}\left(\tan^{-1}\left(\frac{v_y + ar}{v_x}\right) - \delta, \mu\right) \quad (21)$$

$$F_{yF} = f_{tableF}(\alpha_R, \mu) = f_{tableF}\left(\tan^{-1}\left(\frac{v_y + br}{v_x}\right), \mu\right) \quad (22)$$

Where, the lateral velocity $v_y$ and the coefficient of friction $\mu$ are the two unknowns.

The lateral velocity $v_y$ and the coefficient of friction $\mu$ can be estimated by solving equations (21) and (22) with respect to the lateral velocity $v_y$ and the coefficient of friction $\mu$. However, the solution of these non-linear equations may not be unique, especially when the force is small and in the linear range, or may not be stable due to measurement noise, especially when the force is large and near the limit.

To avoid providing unstable or unrealistic solutions, equations (21) and (22) need to be solved with a constraint based on a kinematic relationship between lateral acceleration $a_y$ and the rate of change of lateral velocity $\dot{v}_y$ as:

$$\dot{v}_y = a_y - rv_x \quad (23)$$

The rate of change of lateral velocity $\dot{v}_y$ is represented in terms of lateral acceleration $a_y$, yaw-rate r and longitudinal velocity $v_x$ in equation (23). Because all of the terms in the right side of equation (23) are measured or estimated, the rate of change of the lateral velocity $v_y$ can be calculated as follows.

$$\dot{v}_y|_{measured} = a_{y,compensated} - rv_x \quad (24)$$

At the same time, the rate of change of the lateral velocity can be estimated at every sample time from the lateral velocities at the current and previous time steps as:

$$\dot{v}_y|_{estimated} = \frac{v_y(k) - v_y(k-1)}{\Delta t} \quad (25)$$

Where, $v_y(k)$ and $v_y(k-1)$ represent lateral velocities at the current and previous time steps, respectively, and $\Delta t$ represents the time step size.

The estimated rate of change of the lateral velocity according to equation (25) should be consistent with the measured rate of change of the lateral velocity according to equation (24). Therefore, equations (21) and (22) are solved with the following constraints.

$$\|\dot{v}_y|_{measured} - \dot{v}_y|_{estimated}\| = \left\|\left[\frac{v_y(k) - v_y(k-1)}{\Delta t}\right] - [a_{y,compensated} - rv_x]\right\| < K_{vydot,threshold} \quad (26)$$

Where, $K_{vydot,threshold}$ is a vehicle-dependent threshold, which can be empirically determined considering the noise level of the measurements.

According to another embodiment of the invention, the vehicle lateral velocity $v_y$ is estimated using a dynamic or closed loop observer. The discussion below for this embodiment also employs at least part of the discussion above concerning the vehicle lateral velocity $v_y$. The closed loop observer is based on the dynamics of a single track bicycle model with a nonlinear tire force relations. Such an observer representation results in two state variables, namely, estimated yaw-rate r and lateral velocity $v_y$ as:

$$\dot{\hat{v}}_y = \frac{\hat{F}_{yF}}{m}\cos\delta + \frac{\hat{F}_{yR}}{m} - \hat{v}_x\hat{r} \quad (27)$$

$$\dot{\hat{r}} = \frac{a\hat{F}_{yF}}{l_z}\cos\delta - \frac{b\hat{F}_{yR}}{l_z} + K(r - \hat{r}) \quad (28)$$

In equations (27) and (28), all of the variables with ^ are estimates, $\delta$ is the road wheel angle, m is the vehicle mass, $I_z$ is the vehicle's moment of inertia and K is the yaw-rate observer gain. The gain K is chosen based on offline tuning. In general, this gain can be made a function of forward velocity. The front and rear axle forces are described by the hyperbolic tangent fit function discussed above in equations (11) and (12) and rewritten as:

$$\hat{F}_{yF} = c_{tableF}\hat{\mu}\tanh\left(\frac{d_{tableF}}{\hat{\mu}}\hat{\alpha}_F\right) \quad (29)$$

$$\hat{F}_{yR} = c_{tableR}\hat{\mu}\tanh\left(\frac{d_{tableR}}{\hat{\mu}}\hat{\alpha}_R\right) \quad (30)$$

Inverting these two functions, assuming an estimate of the coefficient of friction $\mu$ is available, and calculating the axle forces from the available measurement, an estimate of the front and rear axle side-slip angles can be given as:

$$\begin{bmatrix} F_{yF} \\ F_{yR} \end{bmatrix} = \begin{bmatrix} \frac{1}{m}\cos\delta & \frac{1}{m} \\ \frac{a}{I_z}\cos\delta & -\frac{b}{I_z} \end{bmatrix}^{-1} \begin{bmatrix} a_y \\ \dot{r} \end{bmatrix} \Rightarrow \begin{array}{l} \hat{\alpha}_F^{table} = \frac{\hat{\mu}}{d_{tableF}}\tanh^{-1}\left(\frac{F_{yF}}{c_{tableF}\hat{\mu}}\right) \\ \hat{\alpha}_R^{table} = \frac{\hat{\mu}}{d_{tableR}}\tanh^{-1}\left(\frac{F_{yR}}{c_{tableF}\hat{\mu}}\right) \end{array} \quad (31)$$

Two lateral velocities are computed from the side-slip angles and kinematics as:

$$v_y^F = v_x \tan(\hat{\alpha}_F^{table} + \delta) - ar \quad (32)$$

$$v_y^R = v_x \tan(\hat{\alpha}_R^{table} + \delta) + br \quad (33)$$

In equations (29) and (30), four lateral force parameters $c_f$, $d_f$, $c_r$ and $d_r$ have been introduced that result from the analysis above, and the estimate of front and rear axle side-slip angles defined, respectively, as:

$$\hat{\alpha}_F = \tan^{-1}\left(\frac{\hat{v}_y - a\hat{r}}{\hat{v}_x}\right) - \delta \quad (34)$$

$$\hat{\alpha}_R = \tan^{-1}\left(\frac{\hat{v}_y - b\hat{r}}{\hat{v}_x}\right) \quad (35)$$

From this, front and rear axle forces are obtained as:

$$F_{yF}^{v_y^R} = c_{tableF}\hat{\mu}\tanh\left(\frac{d_{tableF}}{\hat{\mu}}\hat{\alpha}_F^{v_y^R}\right) \quad (36)$$

$$F_{yR}^{v_y^F} = c_{tableR}\hat{\mu}\tanh\left(\frac{d_{tableR}}{\hat{\mu}}\hat{\alpha}_R^{v_y^F}\right) \quad (37)$$

A virtual lateral velocity $v_y^{virtual}$ that minimizes the error between the estimated and the measured lateral forces is then determined as:

$$v_y^{virtual} = \begin{cases} v_y^R & \text{if } \left|F_{yF} - F_{yF}^{v_y^R}\right| < \left|F_{yR} - F_{yR}^{v_y^F}\right| \\ v_y^F & \text{if } \left|F_{yR} - F_{yR}^{v_y^F}\right| < \left|F_{yF} - F_{yF}^{v_y^R}\right| \end{cases} \quad (38)$$

An observer based on a bicycle model is updated with the yaw-rate and virtual lateral velocity measurements as:

$$\dot{\hat{v}}_y = \frac{\hat{F}_{yF}}{m} + \frac{\hat{F}_{yR}}{m} - v_x\hat{r} + K_{11}(r - \hat{r}) + K_{12}(v_y^{VIRTUAL} - \hat{v}_y) \quad (39)$$

$$\dot{\hat{r}} = \frac{a\hat{F}_{yF}}{I_z} + \frac{b\hat{F}_{yR}}{I_z} + K_{11}(r - \hat{r}) + K_{22}(v_y^{VIRTUAL} - \hat{v}_y) \quad (40)$$

Figure 7:
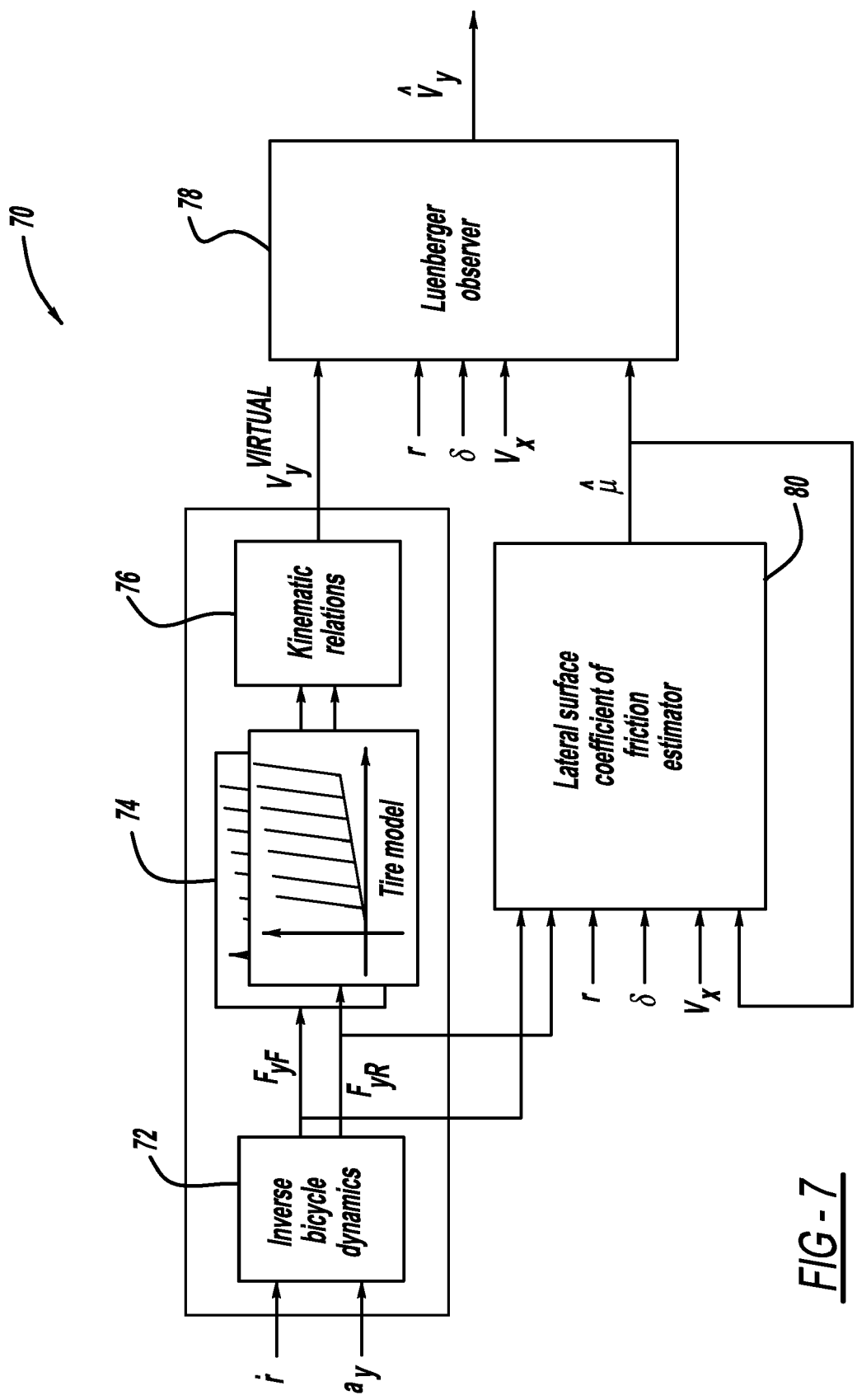
FIG. 7 is a block diagram of a dynamic observer system for estimating vehicle lateral velocity.

FIG. 7 is a block diagram of a dynamic observer system 70 that estimates vehicle lateral velocity $\hat{v}_y$ based on the discussion above. An inverse bicycle dynamics processor 72 receives the yaw-rate change signal $\dot{r}$ and the vehicle lateral acceleration signal $a_y$, and calculates the front and rear axle forces $F_{yF}$ and $F_{yR}$, respectively. The front and rear axle forces $F_{yF}$ and $F_{yR}$ are sent to a tire model 74 that calculates the front and rear axle side-slip angles $\alpha_f$ and $\alpha_r$, respectively. The front and rear axle side-slip angles are provided to a kinematics relations processor 76 that determines the virtual lateral velocity $v_y^{virtual}$ and sends it to a Luenberger observer 78. A lateral surface coefficient of friction estimator processor 80 estimates the surface coefficient of friction μ in any suitable manner, such as discussed above, and receives various inputs including the front and rear axle forces, the yaw-rate, the steering wheel angle and the vehicle speed. The estimated surface coefficient of friction μ is also provided to the Luenberger observer 78 along with the yaw-rate, the steering wheel angle and the vehicle speed signals, which calculates the estimated vehicle lateral velocity $v_y$ using equation (39).

It should be noted that the steering ratio is typically not a linear function of the steering wheel angle. In this context, it is assumed that a fixed steering ratio is employed using an on-center value. However, in practical implementation it would be more appropriate to implement a look-up table that describes the steering ratio as a function of steering wheel angle magnitude. The implementation of the proposed dynamic observer requires the estimate of the surface coefficient of friction μ discussed above.

According to another embodiment of the present invention, the vehicle lateral velocity $v_y$ is estimated using a kinematic observer or estimator. A kinematic estimator is provided using a closed loop Luenberger observer with a kinematic relationship between the lateral velocity and standard sensor measurements for lateral acceleration, yaw-rate and vehicle longitudinal velocity. Measurement updates for the Luenberger observer are based on virtual lateral velocity measurements from front and rear axle lateral force versus side-slip angle tables. The tables represent relationships between lateral force and side-slip angle for combined tire and suspension, which provides the model with a lumped parameter that encompasses everything that affects the lateral forces including tire non-linearity, suspension effect, etc. The lateral velocity estimation is robust to road bank and does not accumulate sensor bias and sensitivity errors.

The kinematic estimator is constructed using a closed-loop Luenberger observer. The observer is based on the kinematic relationship between lateral acceleration measurement and the rate of change of the lateral velocity $v_y$ as:

$$\dot{v}_y = a_y - rv_x \quad (42)$$

$$a_{y,m} = a_y - b_{ay} \quad (43)$$

Where, $b_{ay}$ represents the bias of the lateral accelerometer.

A virtual lateral velocity measurement is calculated using the front and rear axle lateral force verses side-slip angle tables with measured lateral acceleration, yaw-rate and steering angle. The tables give the front and rear axle lateral force relation to the front and rear axle side-slip angles as:

$$F_y = f_{table}(\alpha, \mu) \quad (44)$$

Such as:

$$F_{yF} = c_{tableF}\mu\tanh\left(\frac{d_{tableF}}{\mu}\alpha_F\right) \quad (45)$$

$$F_{yR} = c_{tableR}\mu\tanh\left(\frac{d_{tableR}}{\mu}\alpha_R\right) \quad (46)$$

The front and rear axle lateral forces are calculated from the lateral acceleration and yaw-rate measurements as:

$$\begin{bmatrix} F_{yF,m} \\ F_{yR,m} \end{bmatrix} = \begin{bmatrix} \frac{1}{m}\cos\delta & \frac{1}{m} \\ \frac{a}{I_z}\cos\delta & -\frac{b}{I_z} \end{bmatrix}^{-1} \begin{bmatrix} a_{y,\,compensated} \\ r \end{bmatrix} \quad (47)$$

The lateral acceleration measurement is compensated for vehicle roll.

The front and rear axle side-slip angles are estimated from the calculated front and rear axle lateral forces using the tables.

$$\alpha_{tableF} = f_{tableF}^{-1}(F_{yF,m}, \mu) \quad (48)$$

$$\alpha_{tableR} = f_{tableR}^{-1}(F_{yR,m}, \mu) \quad (49)$$

Multiple virtual lateral velocities are computed from the front and rear side-slip angles as:

$$v_y^{virtual} = f_{\alpha,vy}(\alpha_{tableF}, \alpha_{tableR}) \quad (50)$$

For example, $$v_{y,\alpha F}^{virtual} = v_x \tan(\alpha_F + \delta) - ar \quad (51)$$

$$v_{y,\alpha R}^{virtual} = v_x \tan(\alpha_r) + br \quad (52)$$

$$v_{y,ave}^{virtual} = (v_{y,\alpha F} + v_{y,\alpha R})/2 \quad (53)$$

One virtual lateral velocity is chosen to minimize the error between the measured force and the estimated force as:

$$F_{y,err} = |F_{yF,m} + F_{yF,estimated}| + |F_{yR,m} - F_{yR,estimated}| \quad (54)$$

The estimated force can be calculated as:

$$F_{yF,estimated} = f_{tableF}\left(\tan^{-1}\left(\frac{v_y^{virtual} + ar}{v_x}\right) - \delta, \mu\right) \quad (55)$$

$$F_{yR,estimated} = f_{tableR}\left(\tan^{-1}\left(\frac{v_y^{virtual} + br}{v_x}\right), \mu\right) \quad (56)$$

The observer gain is adaptively changed based on the lateral force and the difference between the measured front and rear axle lateral velocity and the estimated force as:

$$K_{vy} = G_{vy,fF} G_{vy,fR} G_{vy,dvy} \quad (57)$$

$$K_{bay} = G_{bay,fF} G_{bay,fR} G_{bay,dvy} \quad (58)$$

Where, $G_{vy,fF}$ and $G_{bay,fF}$ are a non-linear function of the front axle force $F_{yF}$, $G_{vy,fR}$ and $G_{bay,fR}$ are a non-linear function of the rear axle force $F_{yR}$, and $G_{vy,dvy}$ and $G_{bay,dvy}$ are adaptively changed based on $dv_{y,FR}$, which is the difference between the measured front and real axle lateral velocity and the estimated.

$$dv_{y,FR} = \begin{bmatrix} (v_y + ar) - \\ (v_y - br) \end{bmatrix} - \begin{bmatrix} v_x\tan(\alpha_f + \delta) - \\ v_x\tan(\alpha_R) \end{bmatrix} \quad (59)$$

$$= Lr - v_x \begin{bmatrix} \tan(f_{tableF}^{-1}(F_{yF,m}, \mu) + \delta) - \\ \tan(f_{tableR}^{-1}(F_{yR,m}, \mu)) \end{bmatrix}$$

A linear dynamic system can be constructed using inertial measurements as the input.

$$\begin{bmatrix} \dot{v}_y \\ \dot{b}_{ay} \end{bmatrix} = \begin{bmatrix} 0 & 1 \\ 0 & 0 \end{bmatrix} \begin{bmatrix} v_y \\ b_{ay} \end{bmatrix} + \begin{bmatrix} 1 \\ 0 \end{bmatrix} [a_{y,m} - rv_x] \quad (60)$$

While the kinematic relationship in equation (60) is always valid and robust regardless of any changes in vehicle parameters and surface condition, direct integration based on equation (60) can accumulate sensor errors and unwanted measurements from vehicle roll and road bank angle. Note that equation (60) does not have a term for effects from vehicle roll and road bank explicitly, so the value $b_{ay}$ will include all of these unmodeled effects as well as the true sensor bias. To avoid the error accumulation due to these effects, the observer adopts measurement updates from virtual lateral velocity measurement using the front and rear axle lateral force versus side-slip angle tables as follows.

$$\begin{bmatrix} \dot{v}_y \\ \dot{b}_{ay} \end{bmatrix} = \begin{bmatrix} 0 & 1 \\ 0 & 0 \end{bmatrix} \begin{bmatrix} v_y \\ b_{ay} \end{bmatrix} + \begin{bmatrix} 1 \\ 0 \end{bmatrix} [a_{y,m} - rv_x] + \begin{bmatrix} K_{vy} \\ K_{bay} \end{bmatrix} [v_y^{virtual} - v_y] \quad (61)$$

Where, $K_{vy}$ and $K_{bay}$ are the observer gains and $v_y^{virtual}$ is the virtual lateral velocity measurement from the front and rear axle lateral force versus side-slip angle tables.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A non-transitory computer-readable storage medium with an executable program stored theron, wherein the program instructs a controller to estimate a lateral velocity of a vehicle by performing the following steps:

providing measurements of vehicle yaw-rate, lateral acceleration, longitudinal speed, and steering angle;

providing measured front axle lateral forces and rear axle lateral forces based on the measurements of vehicle yaw-rate, lateral acceleration and steering angle;

calculating a front axle lateral velocity and a rear axle lateral velocity;

calculating a front axle side-slip angle based on the rear axle lateral velocity and a rear axle side-slip angle based on the front axle lateral velocity;

estimating front and rear axle lateral forces;

selecting a virtual lateral velocity that minimizes an error between the estimated and measured lateral axle forces; and providing and estimate vehicle lateral velocity using the selected virtual lateral velocity.

2. The method according to claim 1 wherein calculating the front and rear axle lateral velocities includes using the equations:

$$v_y^F = v_x \tan(\hat{\alpha}_F^{table} + \delta) - ar$$

$$v_y^R = v_x \tan(\hat{\alpha}_R^{table} + \delta) + br$$

where varibles with ^ are estimates, $v_y^F$ is the front axle lateral velocity, $v_y^R$ is the rear axle lateral velocity, $v_x$ is the vehicle foreward, $\alpha_F$ is a front axle slide-silp angle, $\alpha_R$ is a rear axle slide-slip angle, δ is a vehicle steering angle, r is vehicle yaw-rate, a and b are the longitudinal distances of the front and rear axles from the center of gravity and variables with $^{table}$ incorporate table data that are fit using a hyperbolic tangent function.

3. The method according to claim 1 wherein calculating the front axle side-slip angle and the rear axle side-slip angle includes using the equations:

$$\hat{\alpha}_F = \tan^{-1}\left(\frac{\hat{v}_y - a\hat{r}}{\hat{v}_x}\right) - \delta$$

$$\hat{\alpha}_R = \tan^{-1}\left(\frac{\hat{v}_y - b\hat{r}}{\hat{v}_x}\right)$$

where variables with $\hat{}$ are estimates, $\alpha_F$ is the front axle side-slip angle, $\alpha_R$ is the rear axle side-slip angle, $v_y$ is the vehicle lateral velocity, $v_x$ is the vehicle forward speed, r is the vehicle yaw-rate, δ is the vehicle steering angle and a and b are the longitudinal distances of the front and rear axles.

4. The method according to claim 1 wherein estimating the front and rear axle forces includes using the equations:

$$F_{yF}^{v_y^R} = c_{tableF}\hat{\mu}\tanh\left(\frac{d_{tableF}}{\hat{\mu}}\hat{\alpha}_F^{v_R^y}\right)$$

$$F_{yR}^{v_y^F} = c_{tableR}\hat{\mu}\tanh\left(\frac{d_{tableR}}{\hat{\mu}}\hat{\alpha}_R^{v_F^y}\right)$$

where variables with $\hat{}$ are estimates, $F_y^{v_F^R y}$ is the front axle force, $F_y^{v_R^F y}$ is the rear axle force, μ is the surface coefficient of friction, $c_{tableF}$ and $d_{tableF}$ are the front tire parameters, $c_{tableR}$ and $d_{tableR}$ are the rear tire parameters, $v_R^y$ is the vehicle lateral velocity at the front axle and $v_F^y$ is the vehicle lateral velocity at the rear axle.

5. The method according to claim 1 wherein selecting the virtual lateral velocity includes using the equation:

$$v_y^{virtual} = \begin{cases} v_y^R & \text{if } \left|F_{yF} - F_{yF}^{v_y^R}\right| < \left|F_{yR} - F_{yR}^{v_y^F}\right| \\ v_y^F & \text{if } \left|F_{yR} - F_{yR}^{v_y^F}\right| < \left|F_{yF} - F_{yF}^{v_y^R}\right| \end{cases}$$

Where $v_y^{virtual}$ is the selected virtual lateral velocity, $v_y^R$ is the vehicle lateral velocity of the rear axle, $v_y^F$ is the vehicle lateral velocity of the front axle, $F_{yF}$ is the lateral force at the front axle, $F_{yR}$ is the lateral force at the rear axle, $F_y^{v_F^R y}$ is the front axle force and $F_y^{v_R^F y}$ is the rear axle force.

6. The method according to claim 1 wherein estimating the vehicle lateral velocity includes using the equation:

$$\dot{\hat{v}}_y = \frac{\hat{F}_{yF}}{m} + \frac{\hat{F}_{yR}}{m} - v_x\hat{r} + K_{11}(r - \hat{r}) + K_{12}(v_y^{VIRTUAL} - \hat{v}_y)$$

where variables with $\hat{}$ are estimates, $v_y$ is the vehicle lateral velocity, $v_y^{VIRTUAL}$ is the virtual lateral velocity, m is the mass of the vehicle, $F_{yF}$ is the force at the front axle of the vehicle, $F_{yR}$ is a force at the rear axle of the vehicle, $v_x$ is the forward vehicle speed, r is the vehicle aw-rate and $K_{11}$ and $K_{12}$ are gains.

7. The method according to claim 4 wherein the surface coefficient of friction is estimated.

8. The method according to claim 6 wherein estimating the lateral velocity includes using a Luenberger observer.

9. The method according to claim 7 wherein the surface coefficient of friction is estimated using the measured yaw-rate, steering angle, vehicle speed, and the front and rear axle forces.

10. A non-transitory computer-readable storage medium with an executable program stored thereon, wherein the program instructs a controller to estimate a lateral velocity of a vehicle by performing the following steps:
providing measurements of vehicle yaw-rate, lateral acceleration and steering angle;
providing measured front axle lateral forces and rear axle lateral forces based on the measurements of vehicle yaw-rate, lateral acceleration and steering angle;
calculating a front axle lateral velocity and a rear axle lateral velocity;
calculating a front axle side-slip angle based on the rear axle lateral velocity and a rear axle side-slip angle based on the front axle lateral velocity;
estimating front and rear axle lateral forces including using an estimated surface coefficient of friction;
selecting a virtual lateral velocity that minimizes an error between the estimated and measured lateral axle forces; and
providing an estimated vehicle lateral velocity using the selected virtual lateral velocity, wherein estimating the lateral velocity includes using a Luenberger observer.

11. The method according to claim 10 wherein estimating the front and rear axle forces includes using the equations:

$$F_{yF}^{v_y^R} = c_{tableF}\hat{\mu}\tanh\left(\frac{d_{tableF}}{\hat{\mu}}\hat{\alpha}_F^{v_R^y}\right)$$

$$F_{yR}^{v_y^F} = c_{tableR}\hat{\mu}\tanh\left(\frac{d_{tableR}}{\hat{\mu}}\hat{\alpha}_R^{v_F^y}\right)$$

where variables with $\hat{}$ are estimates, $F_y^{v_F^R y}$ is the front axle force, $F_y^{v_R^F y}$ is the rear axle force, μ is the surface coefficient of friction, $c_{tableF}$ and $d_{tableF}$ are the front tire parameters, $c_{tableR}$ and $d_{tableR}$ are the rear tire parameters, $v_R^y$ is the vehicle lateral velocity at the front axle, and $v_F^y$ is the vehicle lateral velocity at the rear axle.

* * * * *